(12) United States Patent
Kawakami et al.

(10) Patent No.: US 7,542,033 B2
(45) Date of Patent: Jun. 2, 2009

(54) METHOD AND PROGRAM FOR GENERATING A TWO-DIMENSIONAL CARTOONISH PICTURIZATION OF A THREE-DIMENSIONAL OBJECT

(75) Inventors: Yosuke Kawakami, Tokyo (JP); Osamu Mizuno, Tokyo (JP)

(73) Assignee: CELSYS Co., Ltd. (JP)

( * ) Notice: Subject to any disclaimer, the term of this patent is extended or adjusted under 35 U.S.C. 154(b) by 40 days.

(21) Appl. No.: 10/376,346

(22) Filed: Feb. 27, 2003

(65) Prior Publication Data

US 2003/0222875 A1 Dec. 4, 2003

(30) Foreign Application Priority Data

Mar. 1, 2002 (JP) .............................. 2002-056032

(51) Int. Cl.
*G06T 15/00* (2006.01)
*G06G 5/00* (2006.01)

(52) U.S. Cl. ....................................... 345/419; 345/582
(58) Field of Classification Search ................. 345/419, 345/420, 421, 426, 581, 582, 589, 473; 382/263
See application file for complete search history.

(56) References Cited

U.S. PATENT DOCUMENTS

| | | | | |
|---|---|---|---|---|
| 5,479,537 A | * | 12/1995 | Hamashima et al. | 382/266 |
| 5,966,134 A | * | 10/1999 | Arias | 345/589 |
| 6,747,642 B1 | * | 6/2004 | Yasumoto | 345/419 |
| 6,847,361 B1 | * | 1/2005 | Kitsutaka | 345/426 |
| 6,943,789 B2 | * | 9/2005 | Perry et al. | 345/420 |
| 2005/0195209 A1 | * | 9/2005 | Lake et al. | 345/582 |

FOREIGN PATENT DOCUMENTS

| | | |
|---|---|---|
| JP | 63-259779 | 10/1988 |
| JP | 07-037105 | 2/1995 |
| JP | 07-073340 | 3/1995 |

(Continued)

OTHER PUBLICATIONS

Foley et al. "Computer Graphics: Principles and pratice", 2nd ed. in C., 1996, pp. 723-725.*

(Continued)

*Primary Examiner*—Ulka Chauhan
*Assistant Examiner*—Daniel F Hajnik
(74) *Attorney, Agent, or Firm*—Lerner, David, Littenberg, Krumholz & Mentlik, LLP

(57) ABSTRACT

A method and computer program are provided for implementing a method for cartoonish picturization by generation from three-dimensional object data. The placement of the three-dimensional object, the view point, and the position of an illumination light source are set. The direction in which the three-dimensional object exists is obtained as mask information, the colors indicating the object are obtained as color information, the distance between the object outer surfaces and the view point is object as distance information, and normal vectors of the outer surfaces are obtained as normal vector information. Based on the mask information, the distance information, and the normal vector information, main lines (61, 71, 76) are plotted (23) as two-dimensional pixels, a based on the color information and a reference value, textures (601, 602, 701, 702) differing about the region of the reference value are applied to achieve visual gradation (24), and the main lines and textures are combined to generate a two-dimensional image that is a cartoonish picturization to be displayed.

10 Claims, 9 Drawing Sheets

FOREIGN PATENT DOCUMENTS

| JP | 07-085310 | 3/1995 |
|---|---|---|
| JP | 7-129762 A1 | 5/1995 |
| JP | 2000-322601 | 11/2000 |
| JP | 2001-070634 | 3/2001 |
| JP | 2001-319244 A1 | 11/2001 |

OTHER PUBLICATIONS

Dietrich, Sim, White paper, "Cartoon Rendering and Advanced Texture Features of the GeForce 256 Texture Matrix, Projective Textures, Cube Maps, Texture Coordinate Generation and DotProduct3 Texture Blending"(Dec. 16, 1999).*

Mege, M., Vaidyanathan, P.P., Look up table (LUT) method for image halftoning, Image Processing, 2000. Proceedings. 2000 International Conference on, 2000, vol. 3.*

Shinji Uchiyama et al., "Layered adaptive patch generation method from a distance image", vol. 36, No. 2, pp. 351-361.

* cited by examiner

METHOD AND PROGRAM FOR GENERATING A TWO-DIMENSIONAL CARTOONISH PICTURIZATION OF A THREE-DIMENSIONAL OBJECT

BACKGROUND OF THE INVENTION

1. Field of the Invention

The present invention relates to the fields of computer graphics, and desktop publishing, and to production of animation and cartoons or the like. More particularly, it relates to a method and program for generating a cartoonish two-dimensional image from data regarding a three-dimensional object within a virtual space.

2. Description of the Prior Art

With improvements in the performance and reduction of the cost of computers and the general availability of associated software, computer graphics technologies have come to be used directly in the production of animations, and the production of cartoons and comics and the like. In the field of computer graphics in the past, three-dimensional objects have been rendered in a virtual space. It is advantageous for the production engineers to utilize the ability to create an object in a virtual space and to verify the finished object on a computer while moving it in various ways and changing its orientation is a great advantage, for shortening actual production process, even in creating a still image that is to be expressed in two-dimensionally at the final stage, such as cartoon. Also, in the field of computer game, computer graphics images are provided to a user as a screen display that is finally shown in the two-dimensional form.

In such fields, in addition to the desire to represent a two-dimensional image viewed by a user in a more natural and precise form that looks like the actual object, there is a desire to make use of a familiar method of representation that is commonly used in the conventional production of cartoons and animations (hereinafter referred to as cartoonish picturization) as a method of representing images.

The term cartoonish picturization as used herein encompasses methods such as the method representing a border between a plurality of three-dimensional surfaces using a "main line" or an emphasized line with a certain thickness, the method of emphasizing the main line representing the border between a background image and a three-dimensional object as an outline, and the method of using "screen tone" to represent a shadow formed in relation to the position of a light source and the existence of a three-dimensional curved surface or three-dimensional object, or representing the brightness of that part using a specific dark coloring. In the past, the artist would employ combinations of such methods, either manually or by DTP techniques.

However, there has been no disclosure of a method for automatically generating such cartoonish picturization from three-dimensional object data.

In the Japanese Patent Provisional Publication 7-129762, there has already been a disclosure of a method for extracting and reconstructing an outline or a shading from an image representing a two-dimensional representation. Using this method, an outline or shading is generated based on information that is found only in the two-dimensional image. For this reason, it is not possible to achieve good representation of main lines by application of this method to computer graphics. For example, it is not possible to use main lines to represent borders between two surfaces placed parallel each other and having different distances (depths) from the view point but the same brightness. This is because a border between those two surfaces shows almost no contrast in a photograph of an actual object or in a computer graphics image. Even in a conventional method without using a computer, it was possible to achieve a cartoonish picturization by the artist adding a main line as required at such borders, however, it is not possible to make such representations using a computer.

In the Japanese Patent Provisional Publication 2001-319244, there is an attempt to add a shading tone image to a three-dimensional object. According to this method, it is possible to use shading tone representation for objects. However, since main lines and outlines are not generated from a three-dimensional object, it is not possible by the mere use of shading tone to obtain cartoonish picturization.

SUMMARY OF THE INVENTION

Accordingly, in view of the above-noted problems in the prior art, it is an object of the present invention to provide a method for implementing the above-noted representation techniques, commonly used in the creation of cartoons and animations, to the representation of an image generated from three-dimensional object data using a computer, and an associated computer program for such a method.

The present invention provides a method for generating a cartoonish picturization of a two-dimensional image from three-dimensional object data and a computer program for implementing this method, the method having a placement input step accepting the placement of a three-dimensional object within a virtual space by an input means, a view point setting step of accepting the position of a view point within a virtual space by an input means, a light source setting step of accepting an attribute of an illumination light source within a virtual space by an input means, a step of obtaining by a processing means the direction in which a three-dimensional object exists, seen from the view point, as mask information, a step of obtaining by a processing means a distance between an outside surface and a view point, as seen from a view point of a three-dimensional object, as distance information, a step of obtaining by a processing means a normal vector respective to an outer surface in a virtual space as normal vector information, a main line plotting step of plotting by a processing means main lines in two-dimensional surface pixels, based on the mask information, distance information, and normal vector information, a step of visual gradation by a processing means, whereby, based on color information and some reference value, gradation is applied to surfaces having textures that differ with regard to the reference value in a two-dimensional surface, and an image displaying step of displaying an image by a processing means, the image being synthesized from main lines in a two-dimensional surface and an adopted texture.

By doing the above, it is possible to implement a cartoonish picturization in a computer graphics image, and to improve the production efficiency using a computer with methods of representation commonly used in the past in the production of cartoons and animations.

In the above, the main line plotting step and the visual gradation step need not be performed in the above-noted sequence. There can be a main line plotting step after obtaining distance information, normal vector information, and mask information, and a visual gradation step after obtaining color information. That is, in addition to the above-noted sequence, it is possible to have a main line plotting step after the visual gradation step, or to perform parallel processing using a parallel processing method with an appropriate processing system.

In addition to the color temperature, direction, and luminance of the light source and whether the light source is a point light source or a collimated light source, which attributes are directly related to the light source itself, the light source attribute can be the position or orientation or the like of the illumination light source in the virtual space.

In the present invention, in the main line plotting step, the main lines that indicate the contour of the three-dimensional object have a different line width than the main lines indicating features other than the contour.

By doing the above, it is possible to achieve a clearer representation of outline parts of an object, thereby facilitating recognition of a border between the object and parts disposed further to the rear therefrom, and enabling a more faithful representation using representation methods used in the past for cartoon and animation production.

Additionally, in the present invention the main line plotting step includes a step of determining by a calculating means a difference value of the distance information using distance information of a current pixel on the two-dimensional surface and distance information of surrounding pixels, and a step of determining by a calculating means a difference value of the normal vector information using normal vector information of a current pixel on the two-dimensional surface and normal vector information of surrounding pixels, from a two-dimensional surface main current pixel and a surrounding pixel, and the main line plotting step makes a judgment by a calculating means of main line plotting, based on a distance difference value and a normal vector information difference value.

By doing this, even for a three-dimensional object defined as being surrounded by some surface, main lines used in a cartoon or the like are determined from the geometrical shape of the three-dimensional object, and it is possible to implement with greater faithfulness a method of representation used in the past for cartoon and animation production.

In addition, in the present invention the visual gradation step applies gradation by numerically generated textures generated by a calculating means using a value calculated from color information and a reference value.

By doing this, it is possible to easily change the reference value using some type of input means so as to achieve a representation by shadow textures.

In the present invention, there is no particular restriction with regard to hardware with which the method and computer program indicated herein is implemented. It is sufficient to have a processing function, the ability to handle images, the ability to input and output files as necessary, an appropriate storage apparatus, and an input means. A typical example of hardware is a computer of arbitrary architecture, preferably provided with a graphics function and a three-dimensional rendering function. This encompasses a video game machine, a personal computer, or a portable telephone or the like provided with a screen. It is also possible to perform execution via a network.

The processing means is a means by which an arbitrary processor performs processing, this being a processing means selected from such means as an MPU, a CPU, a graphics chip, and a digital signal processor or the like. It is also possible for the processing means to be distributed among a plurality of processing means mutually connected via an appropriate bus or network.

It will be understood that the input means can be an input means of the type commonly used in the past, including a character input means such as a keyboard or voice recognition apparatus, a pointing device such as a mouse, a trackball, or a pressure-sensitive tablet, or an arbitrary interface such as a motion capturing apparatus, via which numerical input data is passed to a processing apparatus. Additionally, the present invention does not present a restriction in terms of operating system. It is preferable to have an operating system that enables operation within the above-described environment. It is possible to have a method or a computer program according to the present invention that operate in a multitask or single-task operating system, or in an embedded operating system, or a network operating system.

The method and computer program of the present invention can also be executed by hardware having such functions as a printing function, if necessary. By doing this, it is possible for example for a cartoon artist to achieve a labor savings in performing tasks formerly performed manually.

The terms plotting, depicting, and rendering as used herein refer to the representing visually a picture or an image on an arbitrary display apparatus, storing them into a video memory that outputs a visual representation of the picture or the image, printing them in the case in which an output is obtained on paper, or storage them into a memory for printing output.

The term continuous as appended to the terms gradation and shading herein includes a discrete condition quantized to a degree that creates a substantially continuous appearance (for example, 256 or 64 gradations, which are normally treated as continuous gradations in the field of computer graphics, or gradation display having a small number of colors representing colors and shading using a lookup table).

DETAILED DESCRIPTION OF THE PREFERRED EMBODIMENTS

Embodiments of the present invention are described below in detail, with references made to relevant accompanying drawings.

FIG. 6 and FIG. 7 show examples of images being generated as cartoonish picturizations by using the method according to the present invention.

Figure 6A:
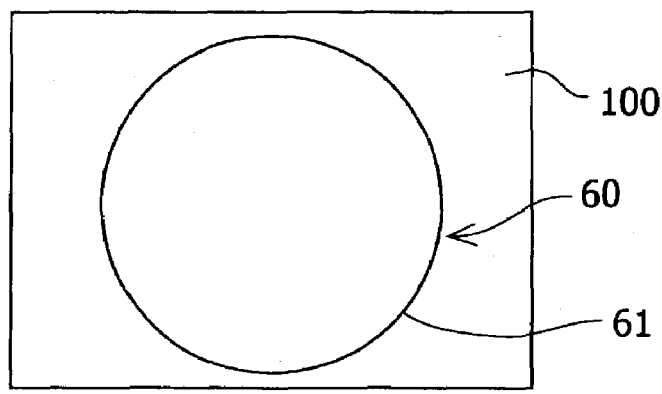
FIG. 6 is a drawing showing the condition of the generation of a two-dimensional image of a cartoonish picturization of a sphere from a spherical object using the method of the present invention.
Figure 7A:
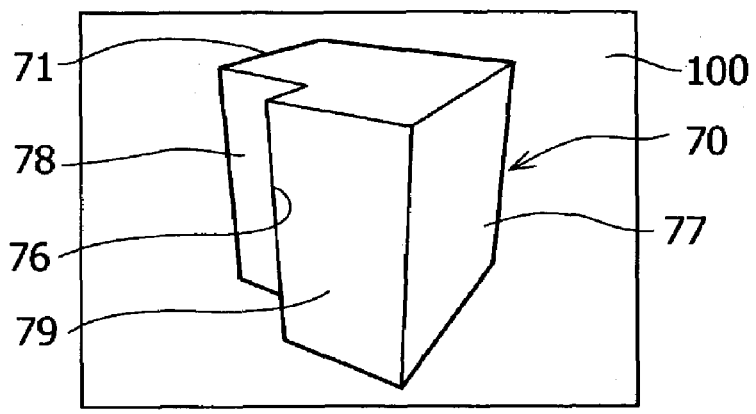
FIG. 7 is a drawing showing the condition of the generation of a two-dimensional image of a cartoonish picturization of a sphere from a polyhedron object according to an embodiment of the present invention.

FIG. 6(a) and FIG. 7(a) show an object obtained by modeling in a virtual space in the preparation stage of the present invention, and an object that is retrieved in the form of data represented by outlines and main lines. An object in a three-dimensional virtual space in which length, breadth and height dimensions are defined is no more than numerical data representing an abstract model in that space. Therefore, although there are various degrees of freedom such as re-positioning, it is not possible to represent it as it is within two dimensions, such as on a two-dimensional display screen or on paper. (For the purpose of this description, a representation already created using outlines and main lines according to an algorithm to be described below is adopted.) FIG. 6(a) shows a spherical surface, and FIG. 7(a) shows a polyhedron, one part of which is detented. It is possible to have other various objects. For example, it is possible, in addition to the objects that can be regarded as characters such as people and vehicles, to have such objects as buildings and background scenery. Regardless of the type of the object, as long as it can be defined in a virtual space, arbitrary object can be selected for creating a cartoonish picturization by the present invention.

At a preparatory stage in the present invention, modeling is performed of a three-dimensional object for which a cartoonish picturization is to be created, or data from advance modeling is input from a file (block 11). In the virtual space the Cartesian coordinates (X, Y, Z) are defined, and the placement of the object within the virtual space is studied, and the position, orientation and the like thereof are adjusted (blocks 12 and 13). The positioning to be used is established (block 14). The positioning of the three-dimensional object within the virtual space is determined in this manner and input (positioning input step).

Additionally, the view point within the virtual space and a parameter such as the frame are established (block 21). In this manner, the positioning that fixes the two-dimensional representation is determined. In establishing this positioning, an arbitrary universal interface such as mouse operation is used, as in normally used in computer graphics. The attributes of the illumination light source to be used later in rendering are also established (light source setting step).

After having its position established, the object is rendered within a two-dimensional frame with which coordinates are established using x and y (block 22). Although not shown in the drawings, the rendering step includes a step of performing perspective conversion of the three-dimensional object in the virtual space onto a virtual screen surface, and a step of pixel value calculation, which determines colors of the object on the virtual screen surface as pixel values. The actually rendered two-dimensional image frame refers to a memory which holds the actual image on the virtual screen or the corresponding thereto.

Using an object, the position of which has been established, the conversion step assumes a surface (virtual screen surface) that is provided between a view point provided within the virtual space and the object, the position of which has been established. By doing this, the shape of the object in the two-dimensional image is perspectively converted onto the virtual screen as though it is seen from the view point.

At the pixel value calculation step, the luminance on the virtual screen surface responsive to the illumination of the object is calculated by a usual calculation method such as the method of ray tracing. By doing this, the position of the illumination and the object in the virtual space and, if necessary, the position and the like of other objects are considered in determining the shading and the like. The calculation is based on Equation 1 that follows:

$$C = (N \cdot L) M_{dif} + L_{amb} M_{amb} \ (N \cdot L > 0) \text{ or } L_{amb} M_{amb} \ (N \cdot L \leq 0). \quad (1)$$

The first term on the right side of Equation (1) is a term representing the manner in which the intensity of a surface is dependent upon the inclination of the light source and the surface, according to the Lambertian rule. The second terms on the right side of the upper level of Equation (1) and the lower right level of Equation (1) are terms representing the ambient luminance Lamb when there is no direct light from the light source and the effect of the coefficient Mamb relative to the ambient light. The Lambertian rule is expressed by the inner product of the vector L of the luminance at that position on the surface and normal vector N that is normal to the surface and is directed outward on the surface of the object, (N·L), multiplied by the diffusion coefficient Mdif of the object surface. The vector L is directed from the surface toward the light source, and the luminance imparted to the surface by the luminous flux of the light source being taken as the length of the vector. The diffusion coefficient is a coefficient dependent on such attributes as the material and color of the surface, and includes reflectivity and gloss information. The relationship of the light source color and the color of the surface can be considered separately. For example, assume the case in which the light source is red and the case when the light source is blue. Even if these light sources impart light to the surface in the same direction and with the same luminance, if the surface is, for example, red, then the reflected light in the case of the red light has a higher intensity compared to the reflected light in the case of the blue light. When considering such effects as the color of the light source and the surface, for more precision, this equation is evaluated for each of the three primary colors red, green, and blue. It is also no impossible to achieve more photometric and colormetric precision. Additionally, simpler methods such as Gourand shading or Phong shading can be used to determine the shading of the surface.

At the rendering of block 22, at all coordinates (x, y) on the virtual screen surface, for each of the three primary colors red, green, and blue the pixel values Ci(x, y) (where i is the color R, G, or B) are calculated. The pixel Ci typically has a value in the range 0 to 255 (in the case of an 8-bit value), and this bit width can be increased or decreased as necessary. Simultaneous with this, a mask M(x, y) indicating whether the object is rendered or not is calculated. The mask (mask information) M is calculated according to Equation (2). The mask M takes the value of 1 for pixels to be rendered and 0 for pixels that are not to be rendered, and is used afterward in plotting the outlines of the object.

$$M(x, y) = \begin{matrix} 1 \text{(Pixel at which a surface is rendered)} \\ 0 \text{(Pixel at which a surface is not rendered)} \end{matrix} \quad (2)$$

An apparatus that executes block 22 is provided with an arbitrary storage apparatus serving as a pixel value memory corresponding to a two-dimensional image frame, a processing apparatus successively storing Ci(x, y), which is rendering data, into the storage apparatus. In the same manner, M(x, y) is stored into a mask memory having an address space for all pixels.

After the above, the main line and outline plotting step (block 23), described in detail below, is determined (block 23). By performing this processing, two-dimensional image data represented numerically within the virtual space, as shown in FIG. 6(a) and FIG. 7(a), is obtained form the object. Line 61 in FIG. 6(a) is an outline generated from a spherical object, line 71 in FIG. 7 is an outline generated from a polyhedral object, and line 76 is a main line. This type of plotting of main lines and outlines can also be done for more complex objects.

The shading processing step (visual gradation step, block 24), which is described in detail below, represents continuous gradation shading using one or more textures. A texture is a dot pattern such as shown for example in FIG. 6 (a) or FIG. 6(c), a type of "screen tone" such as strips (not shown in the drawings) used in the past, or a solid color of a prescribed hue and brightness. This enables the representation of shading using one or more textures having prescribed average brightness.

Figure 6B:
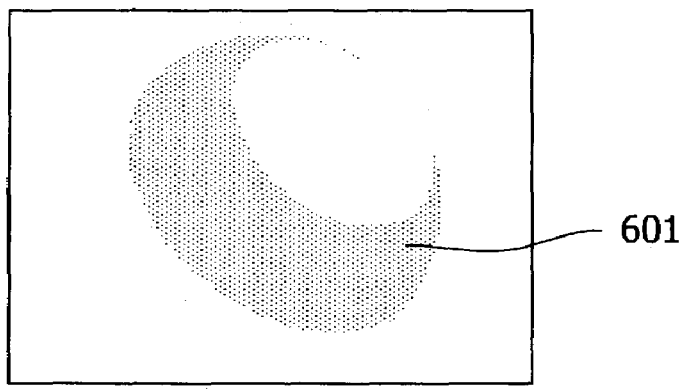
Figure 6C:
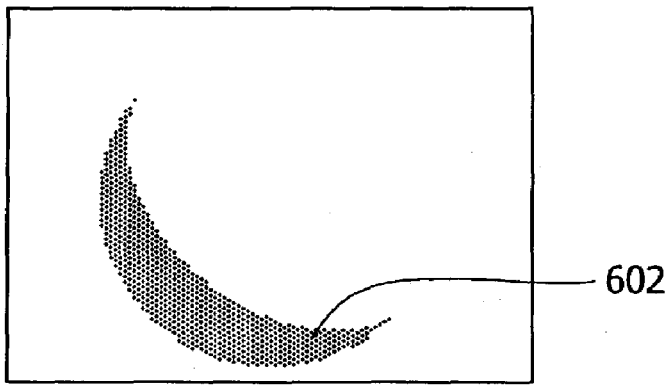
Figure 6D:
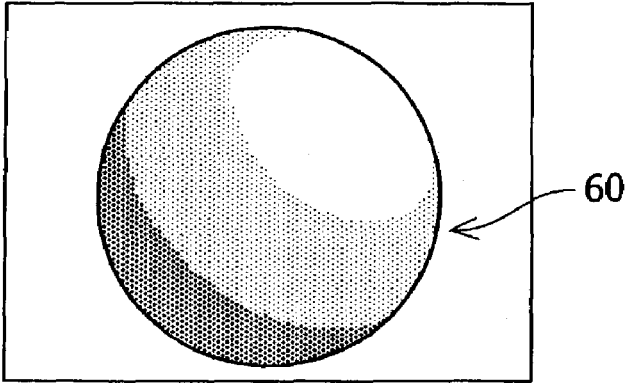
Figure 7B:
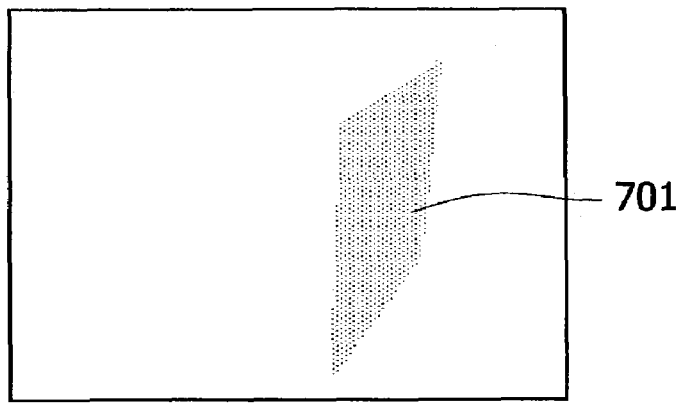

The images created by block 23 and block 24 using main lines and outlines (FIG. 6(a), FIG. 7(a)) and the images represented by shading using textures (FIG. 6(b) and (c) and FIG. 7(b) and (c)) are combined by the image displaying step (block 25) so as to obtain an image that includes a cartoonish picturization. Examples of this are shown in FIG. 6(d) and FIG. 7(d).

Figure 7C:
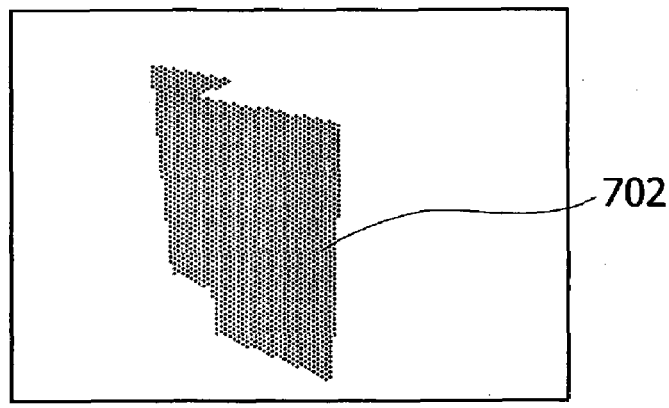
Figure 7D:
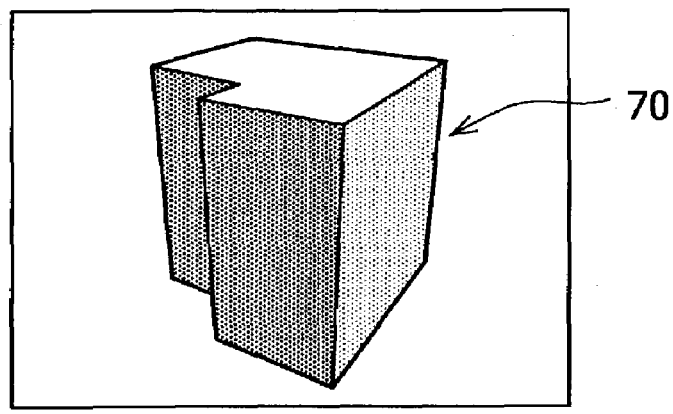

As can be understood from the above, if only FIGS. 6(a) and 7(a) are used, the result may be a combination of the images of only main lines and outlines, and images such as FIG. 6(b) and FIG. 7(c) without using main lines, or combinations of FIG. 7(b) and FIG. 7(c), since the surface brightness is not indicated by textures, it is difficult to grasp the shape of a complex object. Although not illustrated, merely combining, for example, FIG. 6(b) and FIG. 6(c) for an image having real continuous shading is merely the pasting of screen tone onto a real image, which is far from being a cartoonish picturization.

[Main Line and Outline Plotting]

Figure 3:
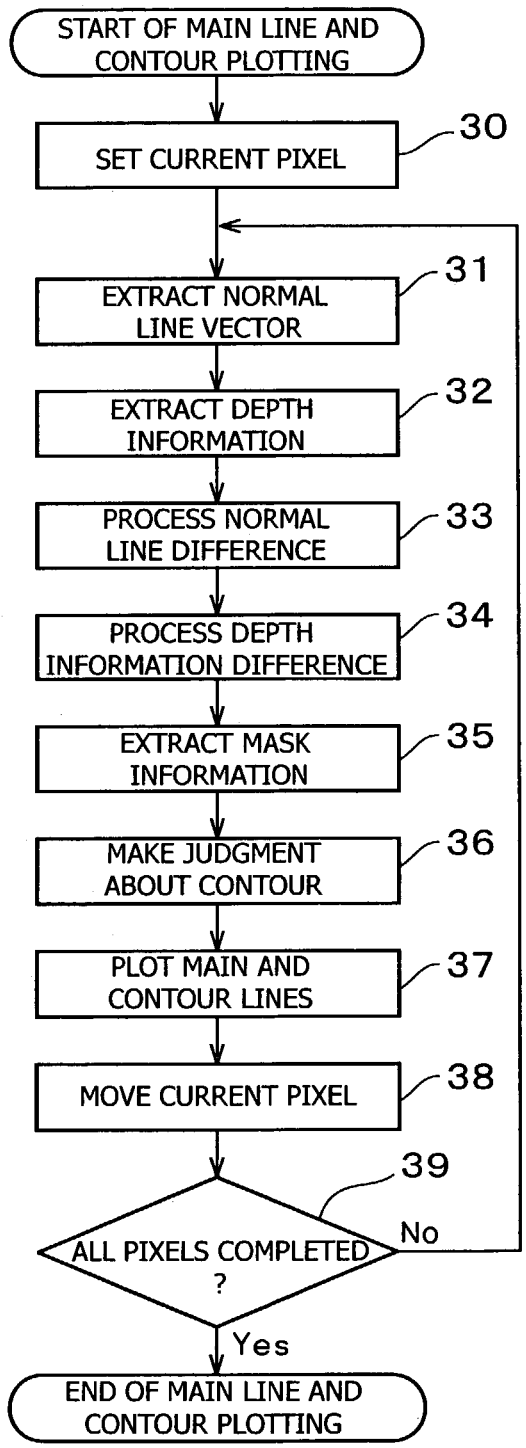
FIG. 3 is a flowchart illustrating the details of the main line and outline plotting step of the present invention.
Figure 5:
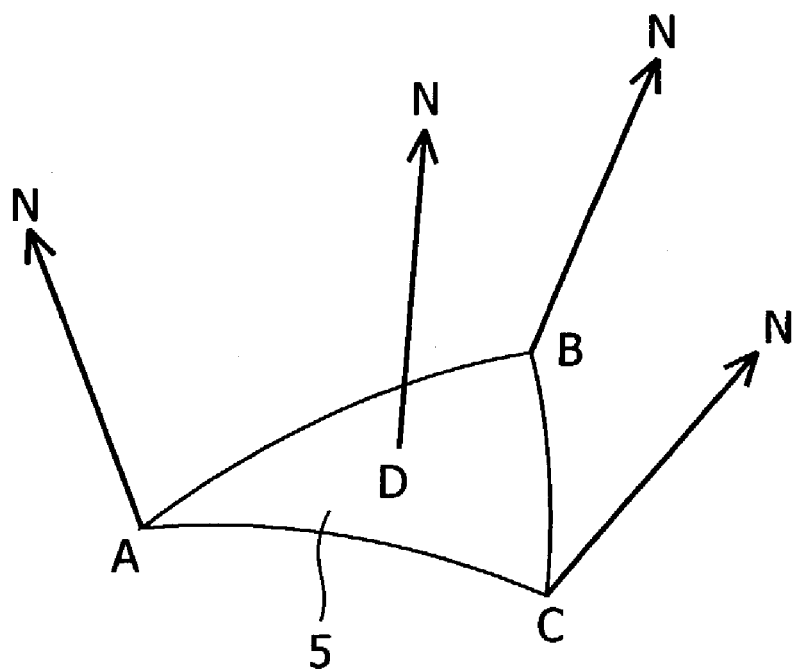
FIG. 5 is an oblique view showing the concept of calculating a normal vector in the present invention.

The step of plotting main lines (including outlines), block 23, which is a feature of the present invention, is described in detail below, with reference to FIG. 3 which illustrates this main line and outline plotting step. In this step, the current pixel within a two-dimensional image frame is first specified (block 30), and the normal vector to the surface of the object is extracted (block 31). For example, in the case of a three-dimensional object represented by polygons, at a surface 5 (FIG. 5) representing an outer surface of the object and having at least three vertices A, B, and C, the normal vector N relative to each of the vertices is established. At a point other than the vertices (for example, D in FIG. 5) the normal vector N can be determined by interpolation from the values of the normal vectors N at the vertices A, B, and C. By so doing, normal vectors at any arbitrary point on any arbitrary surface may be determined. These normal vectors are expressed by components $(N_X, N_Y, N_Y)$ relative to the respective directions X, Y, and Z in the virtual space. It is necessary to extract normal vectors only for surfaces that will be visible finally, and it is not necessary to calculate these vectors for surfaces that are hidden and that will be subjected to hidden surface removal processing. Thus, it is possible to have a normal vector N that belongs to a position (x,y) of an outer contour surface within the two-dimensional virtual space. That is, it is possible to determine $N_j (x, y)$ for j of X, Y, and Z. This is stored into an appropriate storage apparatus, such as a normal vector memory or the like. If a surface of an object is determined by another method, the normal vectors may be determined by other appropriate methods.

Depth information (distance information) is extracted at block 32. This depth information is the distance from a virtual screen in a virtual space to an outer contour surface of the object which a pixel on the screen displays, or the distance from the view point to the outer contour surface. This is determined along a viewing path joining the view point and the object. If there is a z buffer value used in hidden surface removal processing or the like in rendering processing, such value can also be used. While unlike the normal vector, this is a scalar quantity, that is determined as z(x, y) at each pixel (x, y) within the two-dimensional image frame. This can be stored in a depth information memory, or the z buffer value can be used as is.

By doing the foregoing, the mask M, pixel value $C_i$, depth z, and each component $N_j$ of the normal vectors, all at each pixel (x, y) within the two-dimensional virtual space, are determined.

In the case in which neighboring surfaces in a two-dimensional image frame are discontinuous in the virtual space, and the case in which they are continuous but are not connected smoothly, a main line is plotted at the boundary part therebetween. Plotting is also done at the outline portion. In the polyhedronal object 70 of FIG. 7(a), though the surfaces 78 and 79 are neighboring in the two-dimensional image frame, they are not continuous in the virtual space. The surfaces 77 and 79 are neighboring in two-dimensional image frame and continuous in the virtual space, but are not smoothly continuous with being separated by a ridge. In a conventional cartoon or the like, such surface boundary has been drawn by the artist using a line called a main line.

To draw such a main line, for each pixel (x, y) within a two-dimensional image frame, difference values that indicate whether or not z or $N_j$ varies in the vicinity of that point, are derived (blocks 33 and 34). These can be executed by means of a Laplacian filter, and the differences for z and $N_j$ can be determined by Equations (3) and (4), respectively.

$$dz(x, y) = -z(x-1, y-1) - z(x, y-1) - z(x+1, y-1) - \quad (3)$$
$$z(x-1, y) + 8z(x, y) - z(x+1, y) -$$
$$z(x-1, y+1) - z(x, y+1) - z(x+1, y+1)$$

$$dN_j(x, y) = -N_j(x-1, y-1) - N(x, y-1) - N_j(x+1, y-1) - \quad (4)$$
$$N_j(x-1, y) + 8N_j(x, y) - N_j(x+1, y) -$$
$$N_j(x-1, y+1) - N_j(x, y+1) - N_j(x+1, y+1)$$

By using these difference values, the existence or non-existence of a main line and the width thereof are determined. For example, $W_z$ is determined from z according to Equation (5), and $W_N$ is determined from N according to Equation (6), the line width being then determined as an appropriate function of these values:

$$W_z = abs(dz) \times [\text{line-width-coefficient}_z] - [\text{constant } z] \quad (5)$$

$$W_N = (abs(dN_x) + abs(dN_y) + abs(dN_Z)) \times [\text{line-width-coefficient } N] - [\text{constant } N]. \quad (6)$$

Here, constant z and constant N are offset values indicating that a main line is not to be plotted for the case in which it is not possible to obtain a given difference value. When the values of $W_z$ and $W_N$ are negative, a line is not plotted. At block 35, the mask information M(x, y) already calculated by Equation (2) is extracted.

The outlines are also determined. Because mask M has been determined, this is used to enable determining the outline (block 36). That is, the sum of the mask information M for 9 pixels, these being the current pixel and the surrounding 8 pixels, is calculated. If this sum is 0 or 9, this pixel is either inside or outside the plotting region of the object. A sum value other than 0 or 9 indicates a boundary of a projection of the object onto a two-dimensional image frame is included in the current pixel or a surrounding pixel. It is therefore possible to determine that the current pixel is on an outline (block 36). At this point, the outline coefficient variable B is used. The outline coefficient B takes a value greater than 1 in the case in which the current pixel is on an outline, and takes the value of 1 in the case of not being on an outline. Thus, it is possible to define together an equation giving the line width of the main line and an equation giving the line width of the outline. The line width W(x, y) is calculated as shown by Equation (7)

$$W(x,y) = \max(W_z(x,y), W_N(x,y)) \times B \tag{7}$$

Using the line width W obtained in this manner, a circle having a radius of line width W is rendered, having its center at the position (x,y), on an appropriate layer (hereinafter referred to as a main line layer) superposed within the two-dimensional image frame (block 37). If the position of the current pixel is scanned within the two-dimensional image frame, this will become the main line or outline. The main line layer is stored, for example, in an appropriate storage apparatus, such as a main line memory. At the final stage, this main line layer data is displayed, for example, on the two-dimensional image frame. The main line layer can be subjected to an appropriate change in color, and can be rendered as either black or some other appropriate color. In the case in which a cartoon is to be separately printed, it is possible to select the color of this part at the time of printing.

After completing this processing on a current pixel, the current pixel is moved (block 38) and scanning is done to go through all the pixels (block 39). When moving between neighboring pixels, in order to reduce the number of times of accessing the depth information memory and normal vector memory, in the case of moving to a pixel to the immediate right of the current pixel, for example, only the 3 new surrounding pixels to the right are read out of memory, the values for the current pixel and remaining surrounding pixels being taken as the values used for the immediately previous current pixel.

As an alternative to the above-described sequence, it is possible to perform the processing of block 33 immediately after block 31, and to then perform the processing of block 32 and block 34. It is sufficient that the required mask M, depth difference value dz, and the difference values $dN_j$ of each component of the normal vector for the current pixel be determined before the main line and outline plotting of block 37.

As a result of the above-described main line and outline plotting step, FIG. 6(*a*) and FIG. 7(*a*) are obtained. While FIG. 7(*a*) has both main lines and outlines, the outline portions are rendered thicker than the main lines.

Although it is not illustrated, depending upon the object, it is possible to use a texture mapping method or the like to plot the main lines beforehand at the boundary lines (borders surrounding surfaces) which form the object. In the case in which the object is made up of a relatively small number of surfaces and is a combination of polyhedra with straight lines (such as the case of a building), this is efficient in representing main lines by an existing texture mapping method on a rendering scale. In this case, although it is possible to clearly indicate main lines in a two-dimensional image frame, there are cases in which it is not possible to distinguish between main lines and outlines, and cases in which outlines are formed at other places than boundary lines on curved surfaces. In such cases, by use in combination with the outline plotting step, it is possible to represent the outlines by using main lines.

[Shading Processing (Visual Gradation Step)]

Figure 4:
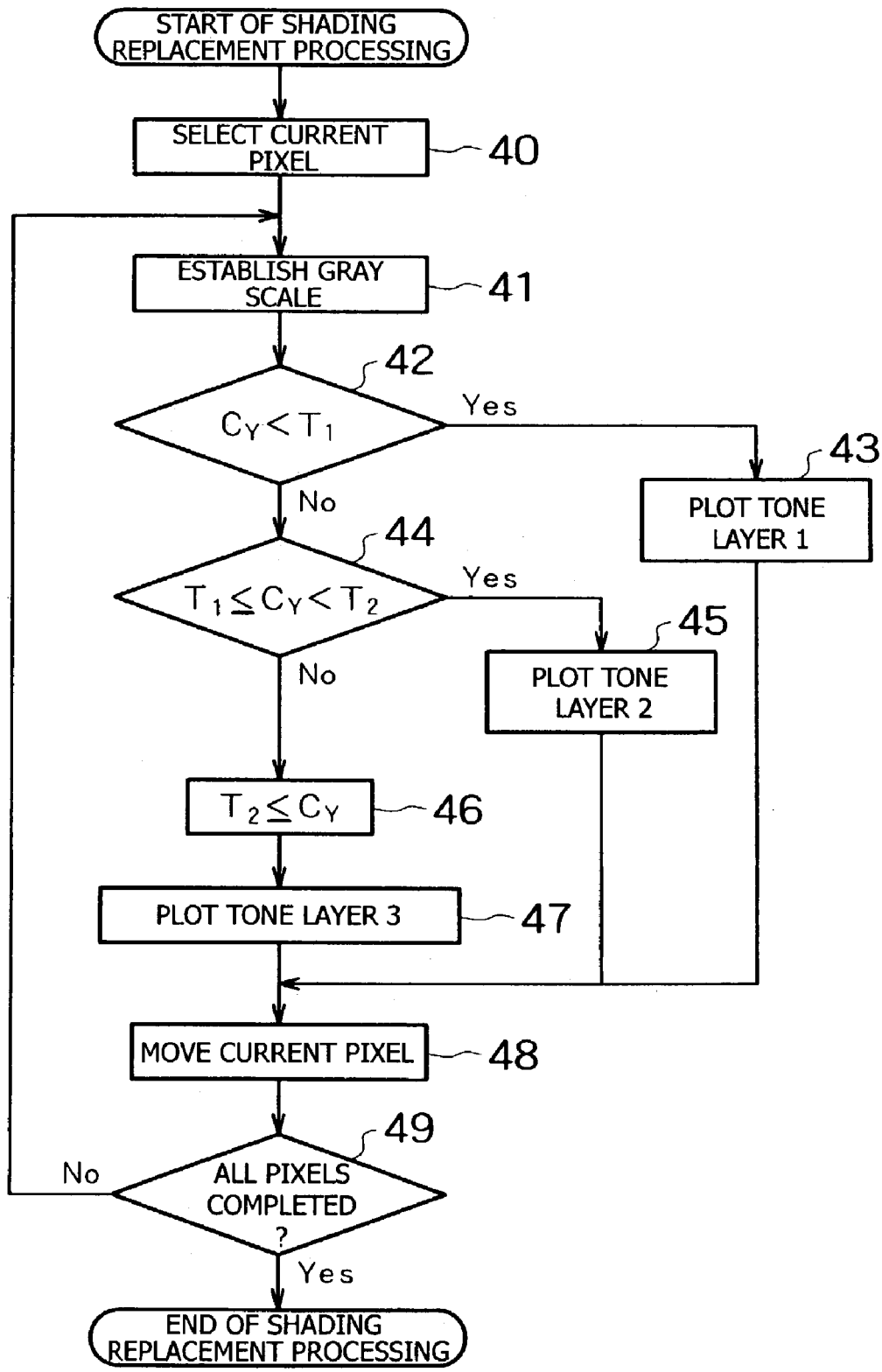
FIG. 4 is a flowchart illustrating the details of the shading processing step of the present invention.

Another feature of the present invention, that of the shading processing step (visual gradation step, block 24) is described below with reference to FIG. 4.

In cartoonish picturization in the past, shadows and the like appearing in a picture were not necessarily rendered faithfully with continuous gradation, these being rendered rather with one or more textures. In many cases, the textures used were known as screen tone, having binary dark and light portions that are placed periodically. These screen tones were, for example, a pattern of round dots in a rectangular or triangular matrix, and FIG. 6(*b*) and FIG. 7(*b*) show patterns similar to this. These screen tones were created by arranging a large number of circles of a color such as black onto a transparent sheet with a given pitch which are defined by "screen line number", or the number of screen lines each 1 inch (2.54 cm). In many cases, patterns having the screen line number of 60 to 70 were used. In addition, many other patterns, such as stripes, are used in cartoonish picturization. It is also possible to use solid shading as a texture. The shading processing step (visual gradation step) of the present invention performs processing so as to recreate this type of texture using a computer, and to use such texture representation to create a real representation of the shading of an object.

In this shading processing, a current pixel is first specified (block 40), and gray-scale processing is performed (block 41). This is done, for example, by calculating the Y signal of a video signal for each point in the two-dimensional image frame, according to Equation (8).

$$C_y(x,y) = C_R(x,y) \times 0.299 + C_G(x,y) \times 0.587 + C_B(x,y) \times 0.114 \tag{8}$$

If necessary, gamma adjustment or the like is performed so as to adjust the brightness or gradation scale of the image (not shown). The $C_Y(x,y)$ of that pixel is then compared with such reference values as $T_1$ and $T_2$ which are predetermined by an operator or given as default values. These reference values establish the number of layers (hereinafter referred to as tone layers) for storing the textures to represent shading, that is, the reference values are defined as may as the number of the layer minus one.

Next, a comparison is made between each reference value $T_k$ (where k=1, 2, ..., (number of tone layers)−1) and $C_Y$. As a result, if the number of tone layers is, for example, 3 and just two reference values $T_1$ and $T_2$ ($T_1 < T_s$) have been established, a tone layer for rendering at that position (x,y) is established with $T_1$ and $T_2$ as the boundaries. For example, if $C_Y < T_1$ (block 42) the current pixel is rendered with the texture stored in tone layer 1 (block 43), if $T_1 < C_Y < T_2$ (block 44) the current pixel is rendered with the texture stored in tone layer 2 (block 45), and if $T_2 < C_Y$ (block 46) the current pixel is rendered with the texture stored in tone layer 3 (block 47). By doing this, if densities are predefined as the coverage rates of circle patterns of the tone layers 1, 2, and 3 it is possible to pre-store textures of some densities, for example, 50% (dark), 20% (somewhat dark), and 0% (no tone), thereby enabling a shading representation such may be found in a cartoonish picturization, in which screen tones are used as textures to represent gradation, after reducing the gradations.

FIG. 6(*b*) and FIG. 7(*b*) show representations using rendering with a screen tone of 20% density stored as texture in tone layer 2. FIG. 6(*c*) and FIG. 7(*c*) show representations using rendering with a screen tone of 50% density stored as texture in tone layer 1. Since representation by a screen tone with 0% density is the same as having no rendering at all, this case is not shown. These textures can be stored in advance into an appropriate storage apparatus, and can alternatively be generated mathematically from some form of mathematical relationship. For example, it is possible to generate a tone of a given density for points having the same value of $C_Y$, divided in accordance with threshold values. Alternatively, it is possible to generate this by performing processing which reduces the brightness while maintaining the original hue of the pixel value $C_i$.

By combining the main line layer prepared at block 23 with one or more tone layers prepared at block 24 to form an image (block 25), the images shown in FIG. 6(d) and FIG. 7 (d) are obtained. Thus, it is possible for an operator to verify as an image the cartoonish picturization of a two-dimensional image generated from three-dimensional object data.

In applications such as computer games and the like, in which the target of the application is achieved by displaying an image, if necessary the object is driven by a geometry engine while the processing of blocks 22 to 25 is performed, thereby causing generation of a continuous animated image, proceeding from frame to fame.

In the actual production phase of an animation, it is possible, if necessary, to check whether the image is what the operator has required. Based on the result, the processing of blocks 22 to 26 are re-executed from appropriate points A, B, and C, so as to efficiently perform the processing of computer graphics that include a cartoonish picturization.

In applications in which, rather than providing images to a user, the images are printed (for example, DTP, and cartoon production), a printing step (block 27) is included, the result of which is the re-execution of processing of blocks 22 to 27 from the appropriate points A, B, and C.

In a method according to the present invention as described above, there is no need for the main line and outline plotting step (block 23) and the shading processing step (block 24) to be performed in this sequence. It is alternatively possible to perform the main line and outline plotting step after performing the shading processing step. Because main lines and outlines are written over shading textures, it is possible to do direct writing into a two-dimensional image frame memory (frame buffer) for image display. Additionally, although current pixels are scanned independently within block 23 and block 24, it is alternatively possible to employ a common scanning loop, after adjusting the use of pixel data for pixels surrounding the current pixel in the difference processing. Thus, it is possible to save memory space by storing only the z difference values and normal vector components $N_j$ for the two-dimensional image frame.

EXAMPLE

Figure 8:
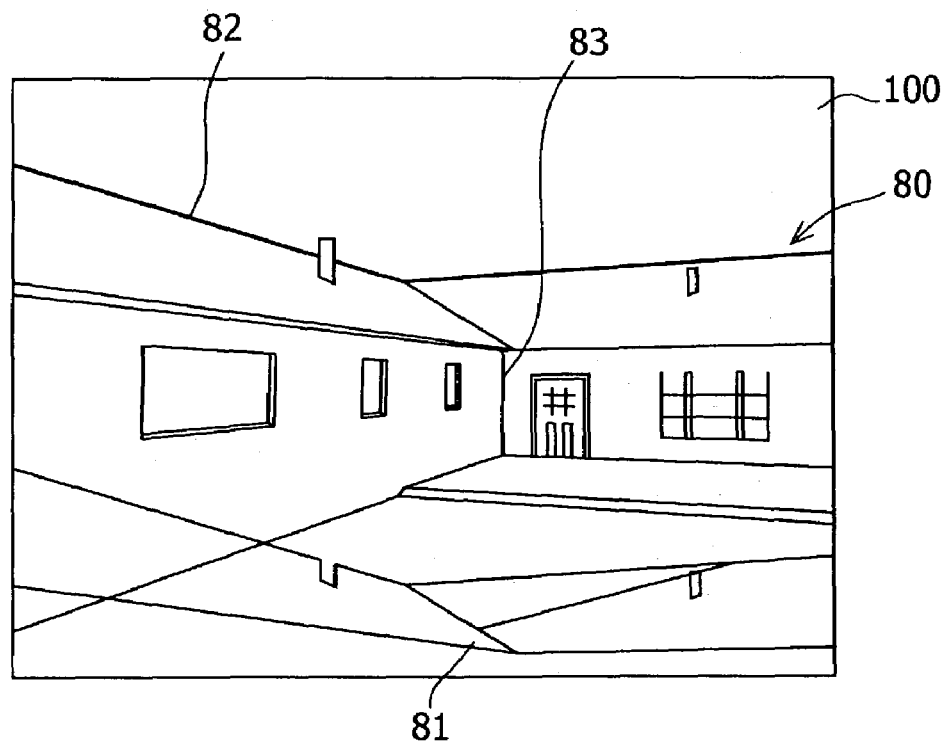
FIG. 8 is a drawing showing a two-dimensional image represented as main lines and outlines generated from a building object according to an embodiment of the present invention.

A cartoonish picturization of a building object is composed as shown in FIG. 8 to FIG. 11. FIG. 8 shows the placement of this building within a two-dimensional image frame. Similar to the case of FIG. 6(a) and FIG. 7(a), the object itself within the virtual space is numerical data, but for the purpose of this description this is shown after the processing for main line and outlines of the present invention is performed.

This object, the building 80, is placed in a virtual space in accordance with the method of the present invention. The "object" denotes and encompasses the visible ground part 81 as well.

Additionally, the operator establishes the illumination that is to irradiate the object 80, as well as the view point and viewing angle for observing the object. In this example, the collimated lighting from virtually directly above is used.

Figure 1:
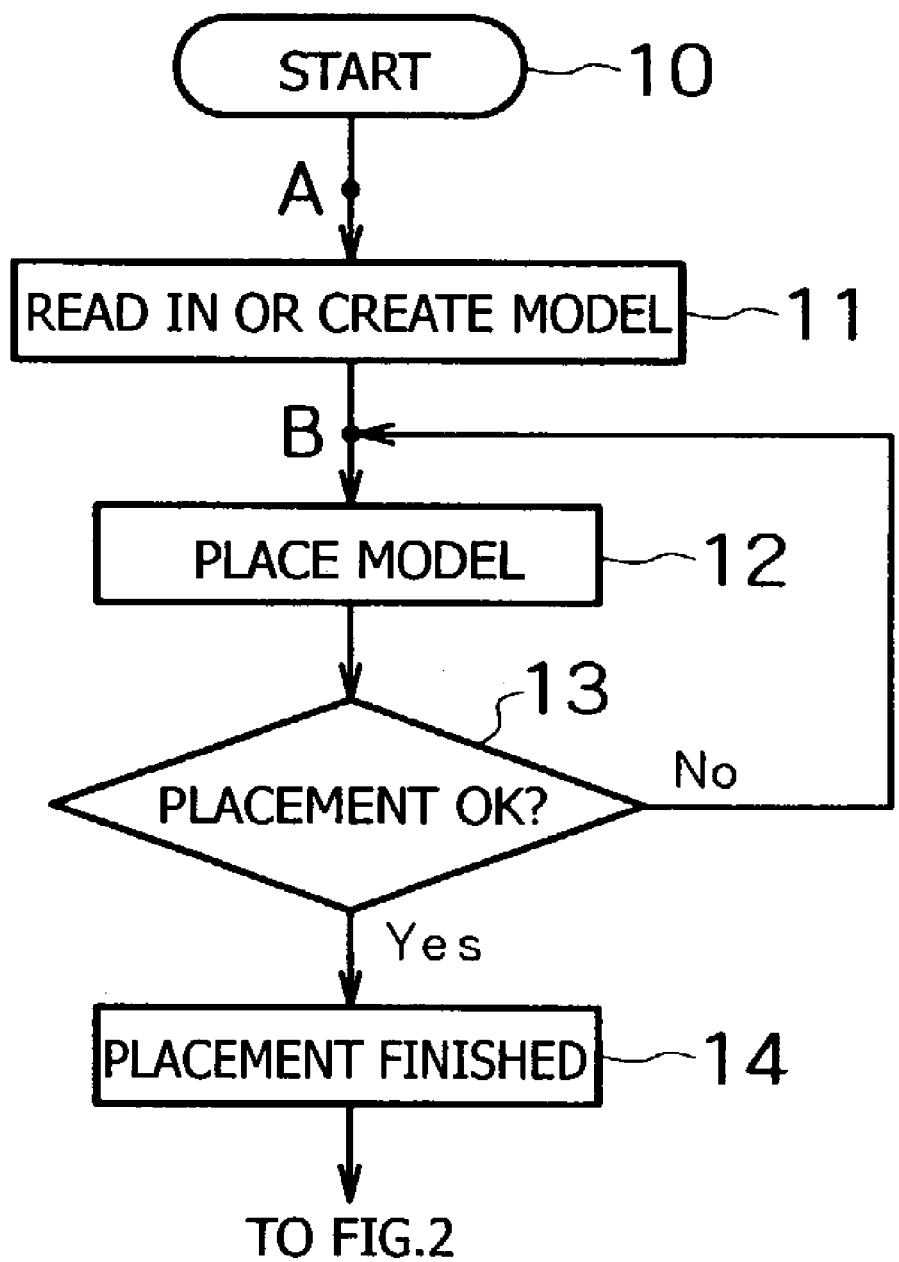
FIG. 1 is a flowchart showing a method of arrangement of a three-dimensional object according to the present invention.
Figure 2:
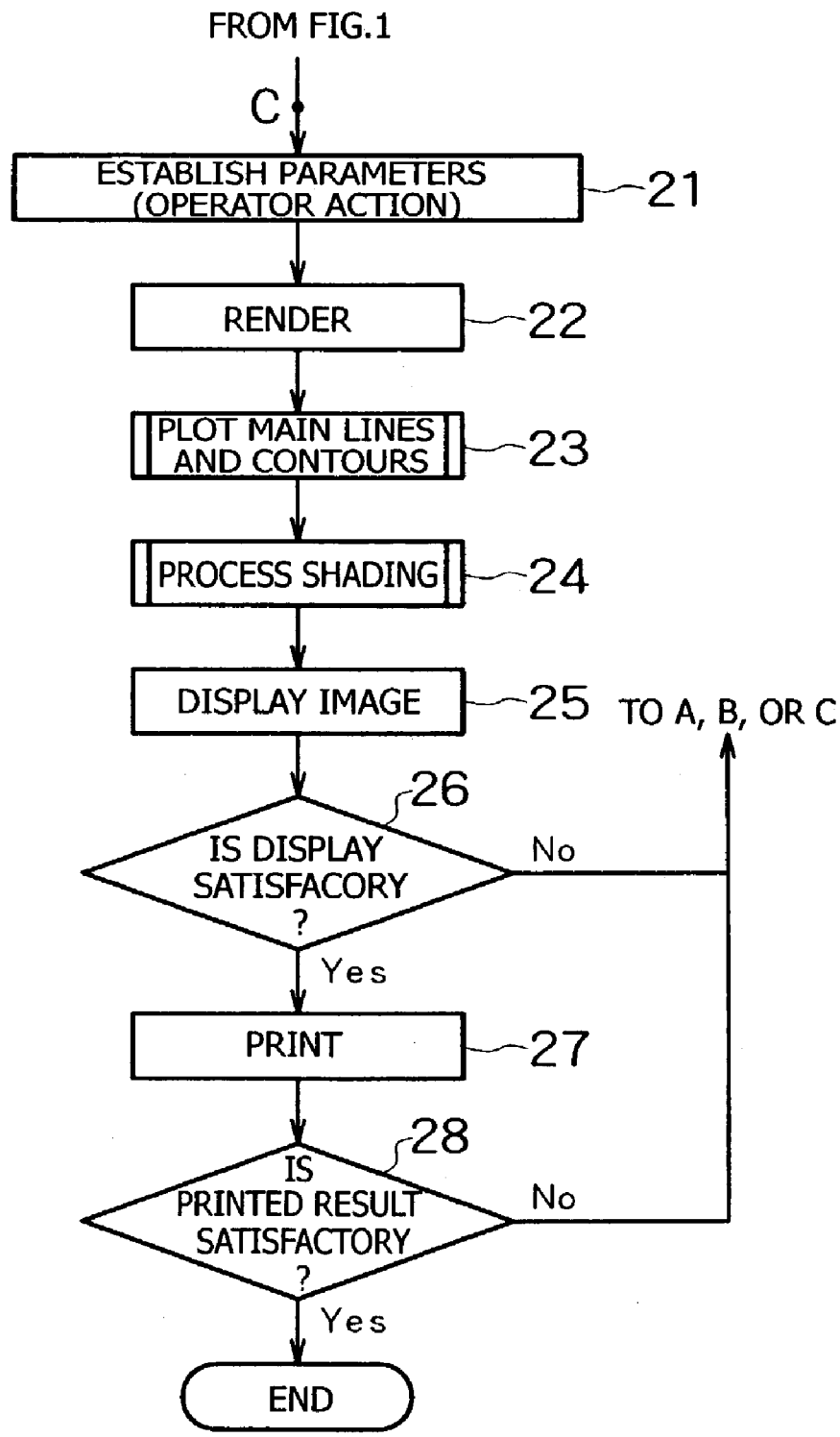
FIG. 2 is a flowchart showing a method for generating a two-dimensional image from three-dimensional object data according to the present invention.

The object is rendered using this light source (conversion step and pixel value calculation step). At the point in time immediately after rendering (immediately after the processing of block 22 in FIG. 2), although not shown there is a great difference in brightness between surfaces, and variation in brightness within surfaces, this being shown as the light part 87 and the dark part 86 of the roof in FIG. 11. Immediately after rendering, this difference is brightness is sensed as a continuous shading gradation, making the representation realistic, although this is not a cartoonish picturization.

After this rendering, main line and outline plotting and shading processing (visual gradation) processing are performed according to the present invention. The main line and outline plotting, in accordance with the present invention, are automatically generated from the distance information between each surface of the object and the normal vector directions. If the parameters (coefficients and constants) in Equation (5) and Equation (6) are changed, it is possible to change the line width, to select all of the boundaries that are plotted as main lines, and to adjust sensitivity of the selection with which they are fully selected or hardly selected. In FIG. 8, line 82 represents an outline obtained by this example, while line 83 is a main line. The outline coefficient B is set 1.5 when a main line is also an outline.

Figure 9:
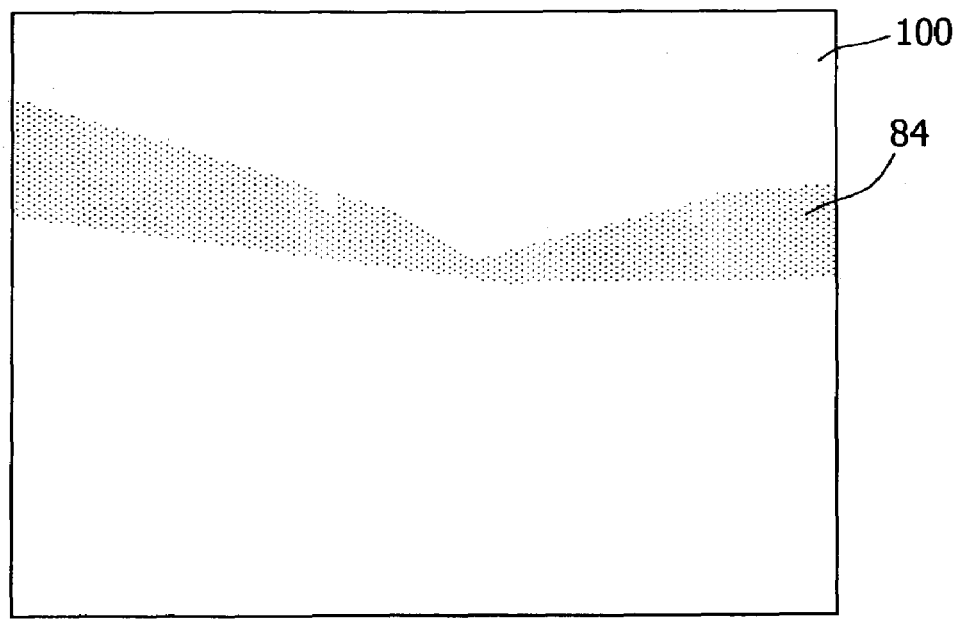
FIG. 9 is a drawing showing a texture pattern (20% dots) generated from a building object and the part represented thereby according to an embodiment of the present invention.
Figure 10:
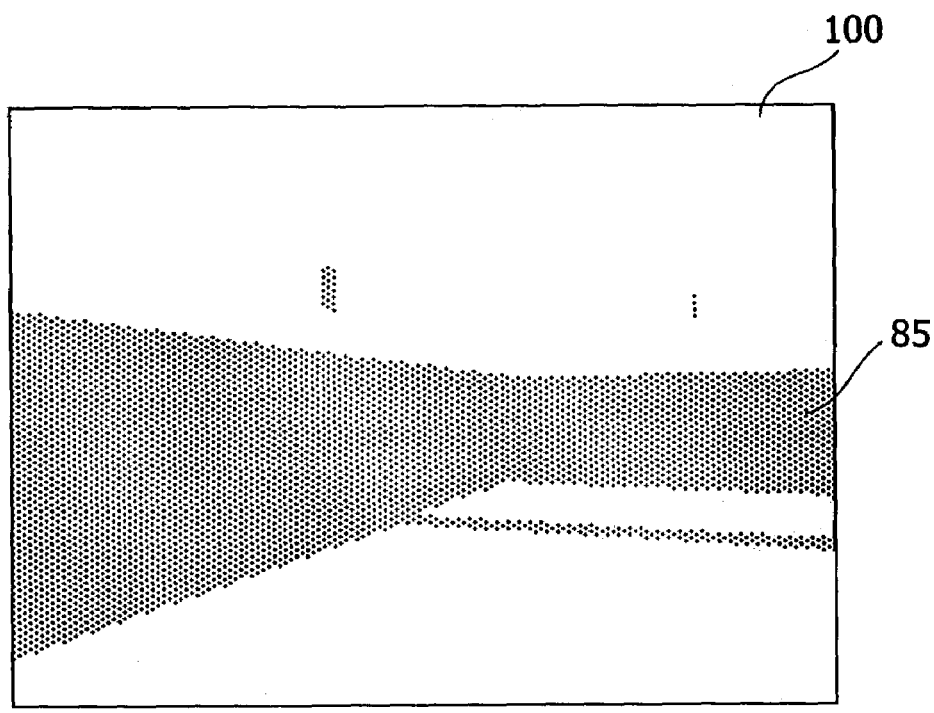
FIG. 10 is a drawing showing a texture pattern (50% dots) generated from a building object and the part represented thereby according to an embodiment of the present invention.

Shading, including white areas, is represented by three types of textures. FIG. 9 shows the arrangement 84 of a 30% shading pattern assigned to the area of intermediate brightness in this example, in which the texture stored in tone layer 2 is cut out in the required shape. FIG. 10 shows the placement 85 of a 50% shading pattern assigned to the area of intermediate brightness in this example, in which the texture stored in tone layer 3 is cut out in the required shape. These assignments are made in accordance with the value of $C_Y$ determined from the RGB pixel values, and are 50% density for values in the range from 0 to 31, 30% for values in the range 32 to 127, and white for values in the range 128 to 255, these being implemented by setting $T_1$ to 32 and setting $T_2$ to 128. Each of the pixel values are pixel values obtained by rendering that uses the diffusion coefficients (including reflectivity and gloss information), which are established as attributes for each surface of the object, the illumination conditions, the directional relationship between the illumination and the surfaces, and the shadows created by the object. Both FIG. 9 and FIG. 10 show the result of automatic generation from a three-dimensional object by performing shading processing (visual gradation processing) according to the present invention.

Figure 11:
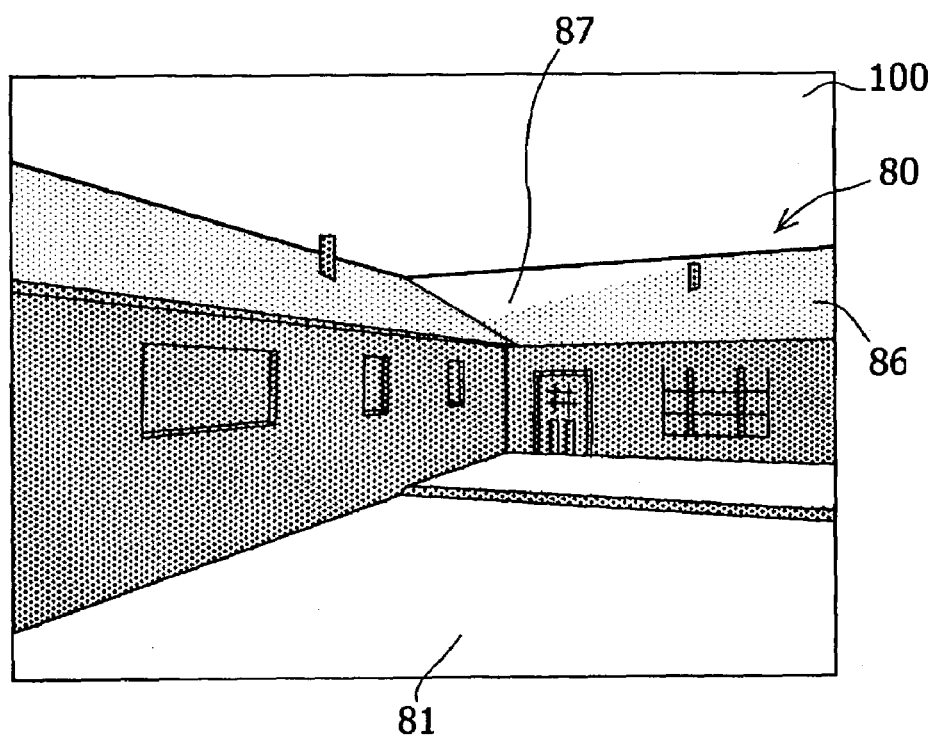
FIG. 11 is a drawing showing a two-dimensional cartoonish picturization synthesized by main lines, outlines, and texture patterns generated from a building object according to an embodiment of the present invention.

The main lines and outlines are combined with texture images generated as described above so as to generate a cartoonish picturization of a two-dimensional image as shown in FIG. 11, this being displayed on a display apparatus. The portions 87 and 86 in FIG. 11 are different portions of the same surface of the same object, but they are rendered in different textures by reflecting gradations in these parts immediately after rendering. By changing the parameters of Equation (5) and Equation (6), it is easy to set to what degree of detail main line plotting is to be done. By changing the outline coefficient, it is easy to emphasize the main lines (outlines) plotted as outlines.

By the operator adjusting the reference value $T_1$ and $T_2$ used as reference values for texture assignment, it is possible to change the part at which the tone texture has been changed, and to change the processing status. Textures other than dot tones discussed can be made available and switched so as to enable a variety of representations of shading so as to create a variety of impressions.

It is possible for the operator to easily change the orientation of the object within the virtual space, and to change the view point. By doing this, it is possible to re-position an object, and to perform perspective correction (depth expression). It is also possible to change the orientation of an object in a different scene, or to reuse objects.

Thus, by virtue of the features of the present invention as described above, it is possible to easily generate from three-dimensional object data a cartoonish picturization as a two-dimensional image in accordance with the intention of an operator.

According to the present invention, it is possible to perform main line and outline plotting using cartoonish picturization such as in the past with computer graphics technology, and also possible to achieve representation of shading using textures of arbitrary patterns or solid color areas having a uniform gradation. By doing this, it is possible to make use of previous representation methods with computer graphics. Additionally, making use of the advantage of a computer in easily repositioning an object, it is possible to use the present invention directly in cartoon or animation production.

What is claimed is:

1. A method for generating a cartoonish picturization of a two-dimensional image from three-dimensional object data comprising:

a placement input step of accepting an arrangement of a three-dimensional object within a virtual space by an input means;

a view point setting step of accepting the position of a view point within the virtual space by an input means to obtain a two-dimensional image frame;

a light source configuration step of accepting an attribute of an illumination light source within the virtual space by an input means;

a step of obtaining by processing means the direction in which a three-dimensional object exists, seen from the view point, for storing the direction as mask information in a mask memory;

a step of obtaining by processing means a color value seen from the viewpoint for each of a plurality of pixels in the two-dimensional image frame corresponding to positions on exposed surfaces of the three-dimensional object under the illumination light source;

a step of obtaining by processing means distance information representative of distances between the exposed surfaces of the three-dimensional object and the view point, as seen from the view point;

a step of obtaining by processing means normal vector information representing a normal vector respective to one of the exposed surfaces in the virtual space;

a step of plotting by processing means main lines representing an outline of the three-dimensional object and boundaries of a plurality of the exposed surfaces of the three dimensional object on the pixels in the two-dimensional image frame, by determining pixels that form the outline in the two-dimensional image frame based on a sum value of surrounding pixels in the mask information, wherein the mask information is retrieved from the mask memory, and by determining the boundaries using the distance information and the normal vector information;

a step of visual gradation by processing means, including comparing the color value of the pixels in the two-dimensional image frame with the at least one reference color value and applying a first texture to an area of each respective exposed surface wherever the color values compare negatively to the reference color value and applying a second texture different from the first texture to the area of each respective exposed surface wherever the color values compare positively to the reference color value, wherein at least one of the first and the second textures has a screen tone pattern of binary dark and light portions having a first uniform pitch throughout, such that boundaries between the first and second textures in the area are determined by the reference color value, and that the pattern is applied on pixels in the two-dimensional image frame; and an image displaying step of displaying an image by processing means, the image being synthesized from the main lines and the applied textures in the two-dimensional image frame.

2. A method for generating a cartoonish picturization of a two-dimensional image from three-dimensional object data according to claim 1, wherein, in the main line plotting step, the main line representing an outline of the object has a different line width than other main lines.

3. A method for generating a cartoonish picturization of a two-dimensional image from three-dimensional object data according to claim 1, wherein the main line plotting step comprises:

a step of determining by calculating means a difference value of the distance information using a Laplacian filter that is applied to distance information of a current pixel and distance information of surrounding pixels in the two-dimensional image frame, and a step of determining by calculating means a difference value of the normal vector information using a Laplacian filter that is applied to normal vector information of a current pixel and normal vector information of surrounding pixels in the two-dimensional image frame, and wherein the plotting of the main line includes making a judgment by a calculating means, based on the difference value of the distance information and the difference value of the normal vector information.

4. A method for generating a cartoonish picturization of a two-dimensional image from three-dimensional object data according to claim 1, wherein the visual gradation step includes numerically generating the different textures by calculating means using the color values and the at least one reference color value.

5. A method for generating a cartoonish picturization of a two-dimensional image from three-dimensional object data according to claim 3, wherein the three dimensional object represents a building.

6. A computer-readable storage medium having information recorded thereon including a computer program executable for performing the method according to claim 1.

7. A computer-readable storage apparatus having information recorded thereon including a computer program executable for performing the method according to claim 2.

8. A computer-readable storage apparatus having information recorded thereon including a computer program executable for performing the method according to claim 3.

9. A computer-readable storage apparatus having information recorded thereon including a computer program executable for performing the method according to claim 4.

10. A computer-readable storage apparatus having information recorded thereon including a computer program executable for performing the method according to claim 5.

* * * * *